United States Patent [19]

Hausler et al.

[11] 3,853,630
[45] Dec. 10, 1974

[54] BATTERY FROM STORAGE CELLS

[75] Inventors: Ernst Hausler; Manfred Stommel; Otto Werner, all of Duisburg, Germany

[73] Assignee: Yardney International Corporation, Los Angeles, Calif.

[22] Filed: Apr. 2, 1973

[21] Appl. No.: 347,108

[52] U.S. Cl. ............................................. 136/114
[51] Int. Cl. ........................................ H01m 21/00
[58] Field of Search ............. 136/114, 90, 102, 111

[56] References Cited
UNITED STATES PATENTS

| | | | |
|---|---|---|---|
| 2,847,494 | 8/1958 | Jeannin | 136/114 X |
| 2,865,976 | 12/1958 | Jommet | 136/111 |
| 3,196,049 | 7/1965 | Schilke | 136/114 X |
| 3,442,709 | 5/1969 | Hoyase | 136/111 X |
| 3,589,947 | 6/1971 | Maxel et al. | 136/114 |
| 3,597,276 | 8/1971 | Jommet | 136/111 |
| 3,649,363 | 3/1972 | Morehouse et al. | 136/114 |
| 3,743,545 | 7/1973 | Merz et al. | 136/114 |

*Primary Examiner*—Winston A. Douglas
*Assistant Examiner*—C. F. Lefevour
*Attorney, Agent, or Firm*—Donald E. Nist

[57] ABSTRACT

The invention deals with a battery made up of storage cells with precharged, dry electrodes, which, after storing, are activated by being filled with an electrolyte. Each cell is provided with its own electrolyte container external of the main body of the cell. Each container is connected via a duct with a central pressure generator so that pressure from the generator forces the container's electrolyte content into the main body of the respective cell.

12 Claims, 6 Drawing Figures

BATTERY FROM STORAGE CELLS

BACKGROUND

1. Field of the Invention

The present invention generally relates to batteries and more particularly those of the multi-cell type wherein the cells are activatable by electrolyte introduction.

2. Prior Art

There are two known systems for activating batteries with precharged, dry electrodes. With the one system the electrode pairs are arranged as a stack or pack in a common battery housing, provided at the bottom or at the top with a central electrolyte chamber whose content during activation is forced into the battery housing thereby exerting pressure upon the central electrolyte chamber. With this system the electrolyte is fed from a central storage through a concentric duct to the individual electrodes. Pressure upon the electrolyte chamber is exerted either by means of an elastic chamber wall or by an expanding gas bubble impinged by a gas chamber within the electrolyte container.

Furthermore, it is known to activate batteries of like systems by means of a centrally located filling device where merely corresponding ducts are provided additionally for introducing the electrolyte into the battery housing. All these designs have the disadvantage that the cells due to the common electrolyte ducts create an electrolytic shunt field which over a period of time leads to capacity losses and overheating.

In order to avoid electrolytic shunts due to common ducts, the second known activating system provides that each single cell of the battery block has its own electrolyte supply in a storage container and that these are operated upon by a central gas tank or gas cartridge. This design provides for each single cell within the battery housing a special electrolyte tank which is connected with the corresponding single cell via an electrolyte conduit. But such a design requires a cumbersome structure with much space and is therefore only manufactured as a rule for special applications.

Accordingly, there is a need for an improved manner of activating cells in a battery, particularly gasproof sealed button cells having the electrolyte encased within.

SUMMARY OF THE INVENTION

The foregoing problems have been solved by the gastight button cells of the invention. Those cells are substantially as set forth in the Abstract above. Each cell has a membrane lid and an individual electrolyte container below and is set in spacers, the plurality of cells being in a cylindrical battery housing. The spacers are furnished with a pressure duct from which leads a lateral duct to each button cell. The pressure duct is connected to a pressure chamber with a pressure inducer. When pressure is induced inside the pressure chamber for activation, this acts upon the membrane lid of each button cell by pressing the same down to the inverted position, causing the electrolyte container below to burst and allow the electrolyte flow into the cell.

The use of spacers in the battery enables any desired number of button cells to be stacked in the battery housing. Therefore, batteries with various capacities and other electric values can be assembled by selection of the appropriate number and type of cell units.

The components required for stacking the new type button cells of the battery are of a special simple design. One type comprises annular shaped spacers, each preferably having an annular shoulder that embraces the arching membrane lid of a button cell and provides a support for the rim area of the lower housing of an adjoining button cell. With this design, the button cells in the stack have a firm and secure support. The ring-shaped spacers should preferably be cemented or welded to each other at their contact surfaces in a manner such that the entire stack of ring-shaped spacers form a closed housing unit for the embedded button cells. The spacers are provided with two outward pointing ribs for the formation of the pressure duct. They are covered and each spacer has its lateral duct within the annular shoulder area. In this way the pressure duct becomes a kind of distributor exerting pressure, by way of the lateral ducts, upon each single button cell in the membrane lid area. At the end of the stack of spacers a fitted plate should be supplied within the battery housing with an opening for the positive connecting cable.

In another design the spacers consist of two half-shells with recesses to take up each half of a button cell stack, whereby semicircular shaped support shoulders as well as pressure ducts leading to the single cells are joint and both half-shells are cemented or welded at their contact surfaces.

At the upper end of the spacers it is feasible to arrange in a simple way for a cylindrically shaped section with a pressure chamber connecting the lateral duct with the pressure duct. Pressure may be produced in various ways. There exists the possibility, for instance, to provide within the pressure chamber a pyrotechnical gas generator whose pressure at ignition acts directly upon the pressure duct. There is also the possibility to utilize a liquid medium for pressure transmission, in which case the pressure duct is filled with a suitable fluid which for activation purpose is also triggered by an ignitable gas generator to be built-in. In a given case the pressure transfer may be carried out by means of a piston triggered by the gas generator or by other means.

The design of the new type button cell is especially simple in that the electrolyte container is so positioned that the usual type of button cell construction is retained. This is accomplished by providing the gasproof button cell with a cap-shaped upper container part with slits or perforations, whereupon lies the electrolyte container covered with a cap-shaped membrane lid. When pressure is exerted upon the cap-shaped membrane lid, it is pressed in and bursts the electrolyte container allowing the electrolyte fluid to flow into the electrode, i.e., the electrolyte is pressed into the electrode area. The electrolyte container is made of a suitable plastic material so designed that it bursts or tears upon impact. Contact elements are placed between the button cells.

Further features of the present invention are set forth in the following detailed description and accompanying drawings.

DRAWINGS

DETAILED DESCRIPTION

Figure 1:
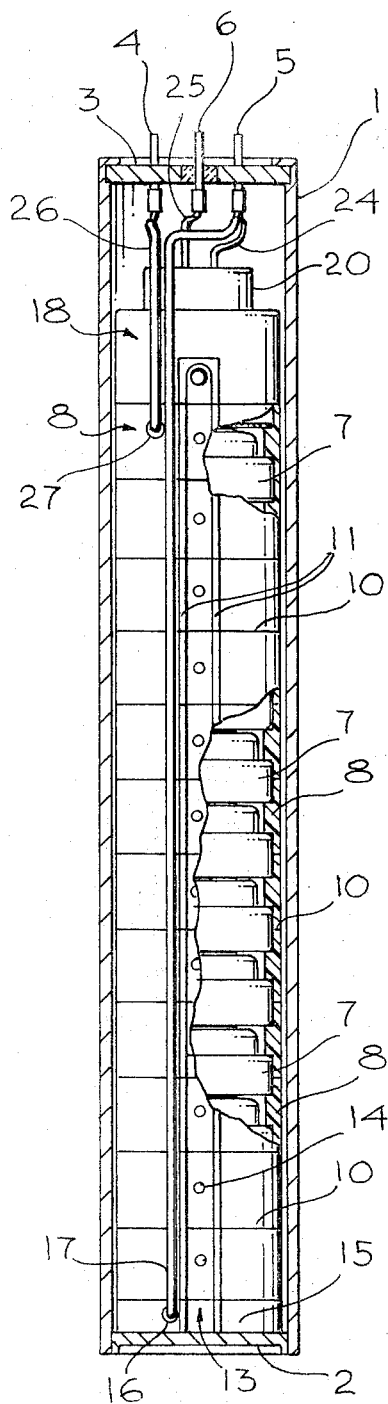
FIG. 1 is a median longitudinal cross section through the first embodiment of a battery of the invention showing a stack of button cells and an activation device therein.
Figure 4:
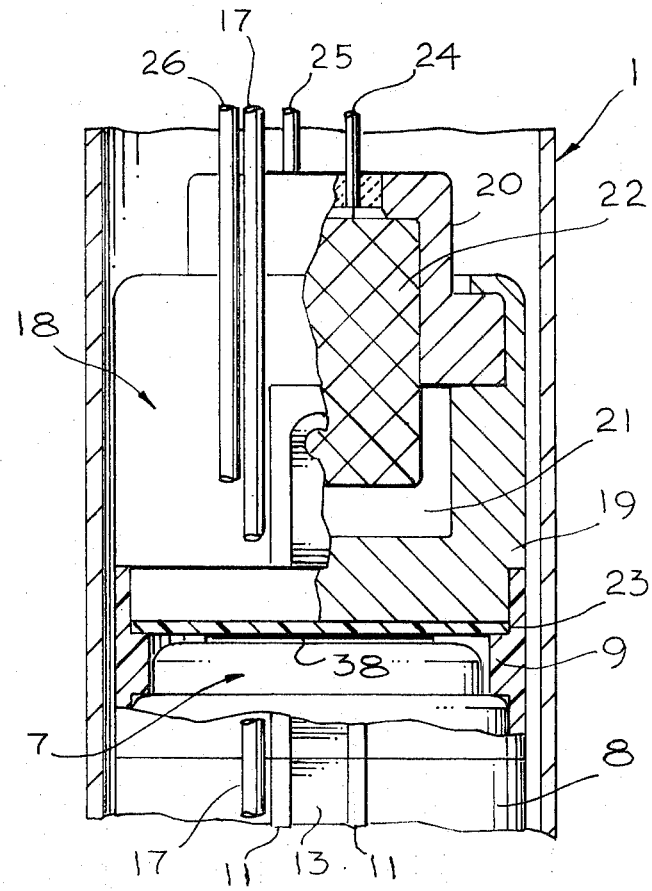
FIG. 4 is an enlarged view of a portion of the battery depicted in FIG. 1.

The battery depicted in FIGS. 1-4 comprises a tube-shaped battery housing 1 which is sealed tight by means of a bottom part 2 and a lid 3. In lid 3 is disposed a positive pole 5, a negative pole 4 and an ignition pole 6, all provided with a vacuum-tight seal (glass). In housing 1 are stacked a plurality of storage cells consisting of button cells 7. Stacking of cells 7 is effected by means of ring-shaped spacers 8.

Figure 3:
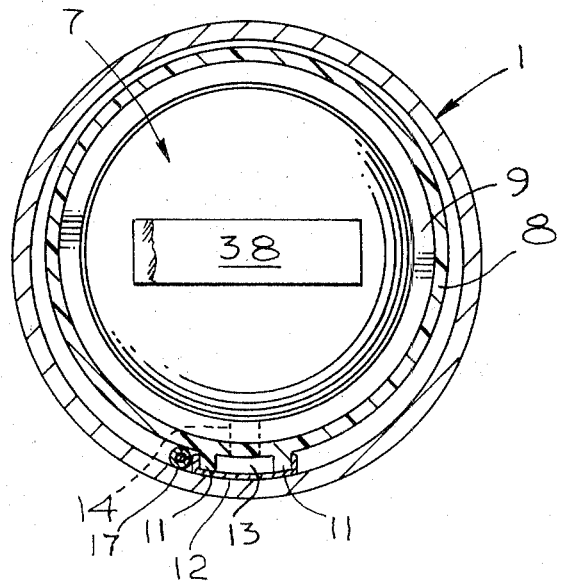
FIG. 3 is a sectional view taken along the section line of FIG. 2.
Figure 2:
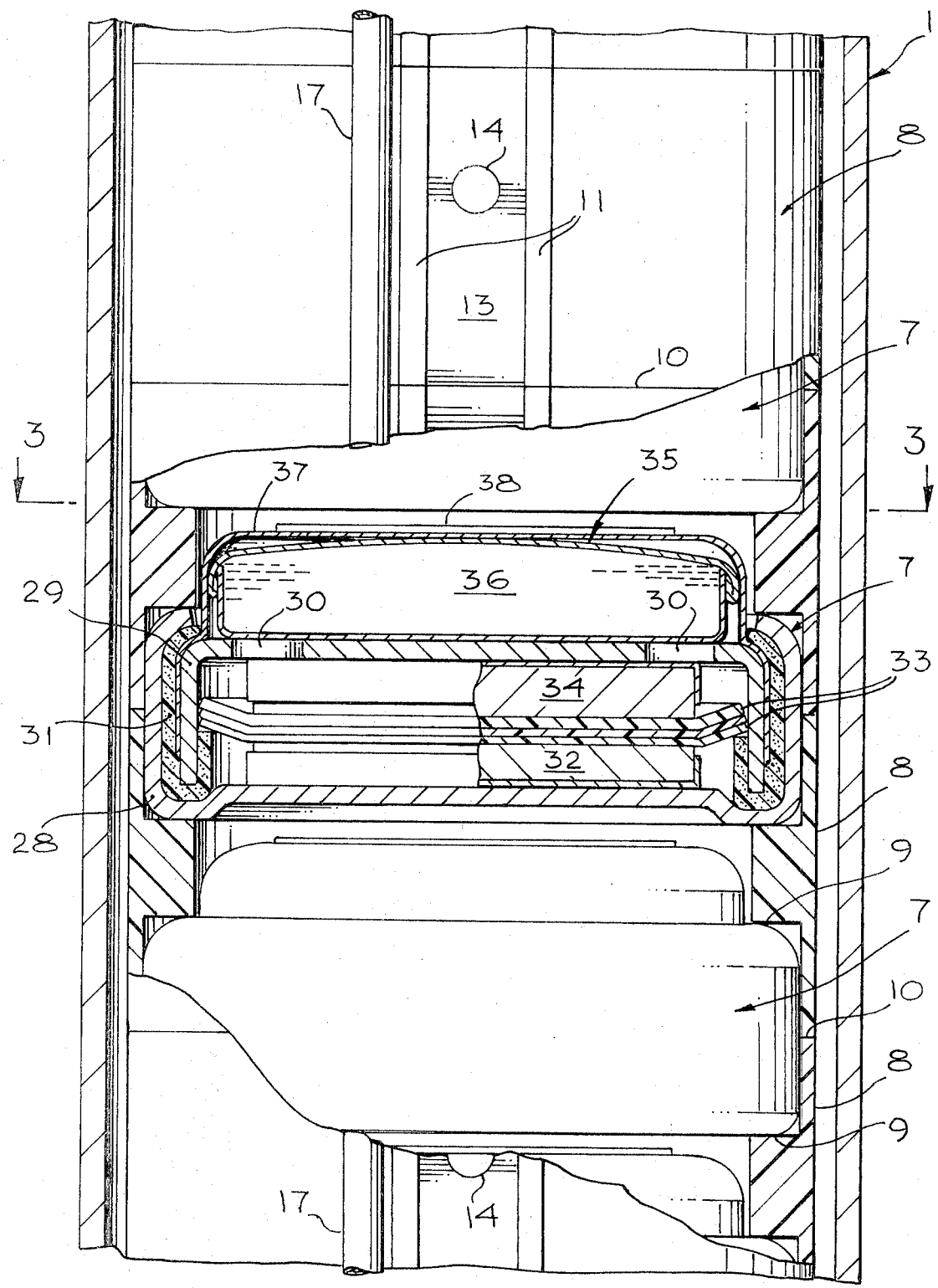
FIG. 2 is an enlarged partly broken away sectional view of button cells in the battery of FIG. 1.

As shown in FIG. 2, each spacer 8 has in its center area an annular shoulder 9 pointing inward which on the one hand rims the somewhat retracted lid area of the button cell and on the other forms a support for the border area of the lower housing of the adjoining button cell. The spacers 8 are cemented, welded or otherwise connected to each other at their contact surfaces 10. As FIGS. 2 and 3 show, each spacer 8 is supplied at the outer wall with two ribs 11 which run toward the longitudinal axis of the battery housing. In the stacked stage these ribs 11 lie aligned with each other, forming between them a pressure duct 13, bounded on its outside by cover wall 12. Each spacer has a transverse duct 14 between ribs 11 in the area of the annular shoulder 9.

The lower end of the stack consists of a plate 15 which is fitted to the shape of the spacers. This plate 15 covers the lower spacer 8 and has an opening 16 for inserting a positive connecting cable 17 which is joined to the positive pole in lid 3 of the battery housing. The upper end of the stack is represented by section 18 consisting of a lower part 19 and an upper part 20 (see FIG. 4). This section 18 has a pressure chamber 21 in which is embedded a pyrotechnical gas generator 22. At the lower end is an insulation disk 23. Positive and negative ignition cables 24 and 25 pass through the upper part 20. Positive ignition cable 24 is connected to the positive pole 5 and negative cable 25 to the ignition pole 6 in lid 3. The negative connection cable 26 which is connected to the negative pole 4 in the lid 3 leads through a cross-bore 27 in the upper spacer 8 (see FIG. 1).

The spacers 8 and the lower plate 15 can be made of an insulating plastic material as for example polyamide resin or the like and can be manufactured cheaply as a mass item. However, section 18 which includes the pressure chamber preferably is fabricated of a suitable metallic material.

As FIG. 2 shows, each button cell includes a saucer-shaped housing underpart 28. To this is fitted a cap-like upper housing part 29 which is provided with slits 30. Slits 30 may have the shape of sections of circles or perforations. Between both housing parts an insulation member 31 is provided which effectively seals off the cell interior. The tablet-shaped positive electrode 32 is placed on the bottom of the lower housing 28. It consists of a precharged, dry, positive electrode material, for example silver-I-oxide, or silver-II-oxide, silver chloride, copper oxide, copper chloride or lead superoxide. The negative electrode 34 is placed in the upper housing and consists, for example, of zinc, lead or magnesium. Between the positive electrode 32 and the negative electrode 34 there are several layers of separators 33. The button cell is preferably made of a positive silver oxide electrode and a negative zinc electrode.

Above the upper housing 30 an electrolyte container 35 is placed consisting of a pillow-shaped plastic sheet material in which the electrolyte 36 is embedded. Electrolyte 36 can be chosen as follows: with an alkaline silver oxide zinc cell it consists, for example, of a watery KOH solution. The electrolyte container 35 is covered by a cap-shaped membrane lid 37 whose rim is sealed tight with the rim part of the upper housing 29 at the flanged wall of the lower housing 28. Membrane lid 37 is preferably made of a thin flexible metal sheet, as for example copper. For assembly of the battery one builds up first the button cell stack by setting a button cell upon the bottom plate 15 and connects the positive cable 17 through opening 16. Then spacers 8 and button cells 7 are stacked in sequence with interpositioning electrically conductive contact elements 38 such as metal springs, etc. whereupon all spacers are either cemented or welded to each other at their contact surfaces 10.

The negative connecting cable 26 is likewise connected at the upper button cell 7 and is fed through the cross-bore 27 of the upper spacer 8. Section 18 with pressure chamber 21 and gas generator 22 are added. The thus built-up stack is placed into the battery housing 1 and the cables are fastened at the provided poles of lid 3 which is then set up on the battery housing 1 and fastened by flanging.

The operation of the described battery is as follows:

When the button cells are to be activated after storage, it is only necessary to connect an ignition device to the positive pole 5 and the ignition pole 6 and to fire the gas generator 22. Gas pressure goes via the pressure duct 13 and cross ducts 14 to each button cell 7, whereupon each flexible membrane lid 27 is pushed in and instantly destroys the adjoining electrolyte container 35. The electrolyte 36 then flows through the slits 30 of the upper housing part 29 into the interior of each button cell where it assumes its electrochemical task.

Figure 5:
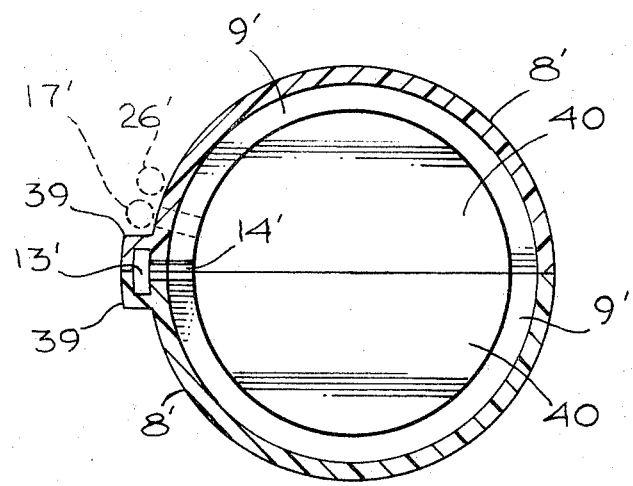
FIG. 5 depicts in enlarged horizontal section a portion of the second embodiment of a battery of the invention; and, FIG. 6 is an enlarged broken away view of a portion of said second embodiment.
Figure 6:
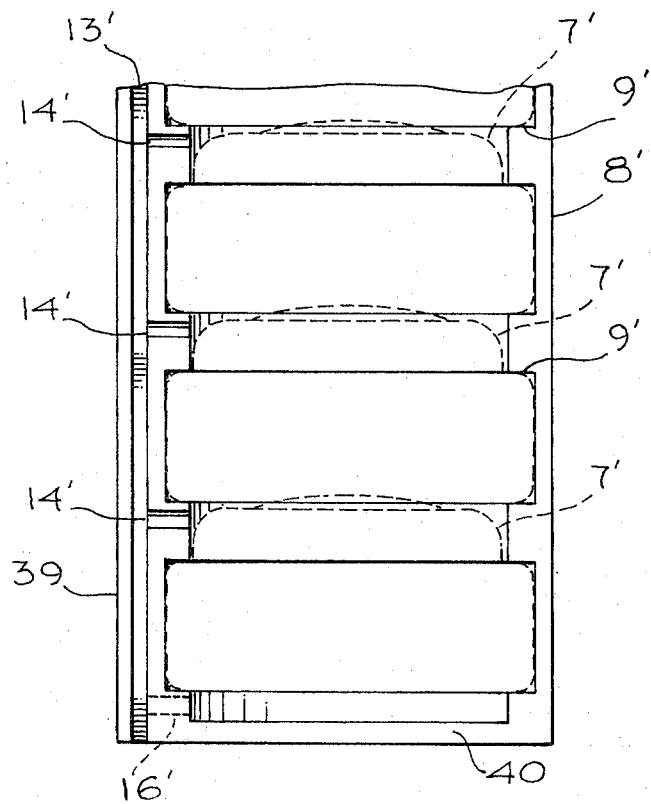

FIGS. 5 and 6 depict a second embodiment of the invention, those components of which are similar to those of the embodiment of FIGS. 1-4 bear the same numerals but are succeeded by the prime sign. Thus, a spacer 8' is shown. This consists of two plastic half-shells which encompass a stack of button cells diagonal to the longitudinal axis. The two half-shells have corresponding recesses to take up each half of a button cell stack and formed supporting shoulders 9' which correspond to the annular shoulders 9. In addition, each half-shell has shanks 39' for the formation of pressure duct 13', as well as grooves for formation of the cross ducts 14'. After positioning the button cells 7', interspersed with electrically conductive contact springs, the two half-shells are superimposed, cemented or welded to each other. In this type of configuration half of a bottom plate 40 as well as an upper cover plate, not shown in the drawing, is assigned to each half-shell.

Likewise, openings for the upper and lower connecting cables 17' and 26' are provided.

The subject of this invention is not limited to the described examples, since numerous changes are feasible without exceeding the framework of the invention. There exists, for example, the possibility to manufacture a battery with more or fewer button cells whereby either the battery housing 1 is kept shorter or longer, or where in a larger battery housing there remains empty space. It is advisable to use a filler compound for the remaining space between battery housing 1 and the spacers 8 as well as section 13. Furthermore, there is the possibility to use a suitable hydraulic fluid in lieu of the gas pressure generator in pressure duct 13 which transmits that pressure to each button cell 7. Pressure may be furnished either by means of a piston (not shown) which is activated either mechanically or by a pyrotechnical gas generator; it is also possible to utilize the pressure of a gas cartridge directly upon the fluid. A mechanical pressure transmission can furthermore be provided for and the possibility exists to form the membrane lid differently or choose for the same another suitable working material.

Various other modifications can be made. All such modifications as are within the scope of the appended claims form part of the present invention.

What is claimed is:

1. A battery comprising a plurality of gasproof button storage cells, each with precharged, dry electrodes disposed within a cell housing, said cells being stacked in a battery housing and activatable by introduction of an electrolyte thereinto, each cell being sealed and having its own electrolyte container within said cell housing, each said container being connected via a pressure duct with a central pressure generator having a pressure inducer, whereby pressure exerted from said generator forces electrolyte in said container from the same and into contact with said electrodes in said cell, each said cell having a curved deformable membrane lid with said electrolyte container arranged underneath said lid, said battery including spacers defining said pressure duct from which leads a cross duct to each said lid.

2. The battery of claim 1, wherein each said spacer is ring-shaped and has annular shoulders pointing inward which embrace the membrane lid of one of said button cells and forms a support for the peripheral edge of the lower part of the housing of the next adjoining button cell in said stack.

3. The battery of claim 2, wherein said spacers are secured together at their contact points.

4. The battery according to claim 3, wherein said spacers each have two ribs wherein a coverplate is provided and wherein said cross duct of each said spacer is defined in the annular shoulder of said spacer.

5. The battery according to claim 1, wherein a bottom plate is provided at the bottom part of said battery housing, said bottom plate embracing the lowermost button cell of said stack and covering the lowermost of said spacers, said button plate defining an opening for inserting a positive connecting cable into said battery.

6. The battery of claim 5, wherein the uppermost spacer ring defines a cross-bore for insertion of a negative connecting cable into said battery.

7. The battery of claim 1, wherein each said spacer comprises two half-shells with recesses for receiving half of each button cell stack, said half-shells being joined together to define ring-shaped support shoulders and said pressure ducts leading to the several cells of said stack.

8. The battery according to claim 1, wherein said battery includes at the upper end thereof a cylindrical section having a pressure chamber connected via a cross duct with said pressure duct.

9. The battery of claim 8, wherein a pyrotechnical gas generator is in said pressure chamber for exertion of gas pressure directly upon said pressure duct.

10. The battery of claim 1, wherein each said button cell includes a cap-shaped upper housing part with openings whereupon said electrolyte container lies, covered by said membrane lid, and wherein said container comprises material that readily bursts upon impact.

11. The battery of claim 10, wherein said membrane lid is formed of a thin, flexible metal sheet.

12. The battery according to claim 11, characterized by the fact that electrically conductive contact elements are disposed between adjacent of said cells in said stack.

* * * * *